United States Patent [19]

Lederman

[11] Patent Number: 5,046,229
[45] Date of Patent: Sep. 10, 1991

[54] METHOD FOR MANUFACTURING AND ASSEMBLING A CONTROL CAR ROLLER CLUTCH WITH FOUR PIECES

[75] Inventor: Frederick E. Lederman, Sandusky, Ohio

[73] Assignee: General Motors Corporation, Detroit, Mich.

[21] Appl. No.: 577,239

[22] Filed: Sep. 4, 1990

[51] Int. Cl.⁵ .................. B23P 17/00; F16D 3/34
[52] U.S. Cl. ..................................... 29/418; 29/413;
   29/423; 29/898.049; 29/898.061; 29/898.067;
   192/45; 384/572
[58] Field of Search ............... 29/898, 898.04, 898.06,
   29/898.061, 898.062, 898.063, 898.064, 898.065,
   898.66, 898.067, 898.15, 413, 414, 418, 423, 464,
   DIG. 29; 192/45, 44, 41 R; 188/82.84; 384/559,
   560, 572, 576; 264/163

[56] References Cited

U.S. PATENT DOCUMENTS

| | | | |
|---|---|---|---|
| 3,182,276 | 5/1965 | Ruehlemann | 29/423 X |
| 3,917,036 | 11/1975 | Johnson et al. | 192/45 |
| 4,679,676 | 7/1987 | King et al. | 192/45 |
| 4,787,490 | 11/1988 | Lederman et al. | 192/45 |
| 4,821,856 | 4/1989 | Lederman | 192/45 |
| 4,893,702 | 1/1990 | Lederman | 192/45 |
| 4,901,833 | 2/1990 | Lederman | 192/45 |
| 4,921,084 | 5/1990 | Lederman | 192/45 |
| 4,924,980 | 5/1990 | Lederman | 192/45 |
| 4,924,981 | 5/1990 | Johnston et al. | 192/45 |

Primary Examiner—Joseph M. Gorski
Assistant Examiner—S. Thomas Huges
Attorney, Agent, or Firm—Patrick M. Griffin

[57] ABSTRACT

A control car roller clutch is manufactured and assembled by providing two annular end rings, a molded unit that integrates the control cars and journal blocks, and a removable carrier ring that temporarily retains the cars and blocks as the integral unit.

3 Claims, 4 Drawing Sheets

METHOD FOR MANUFACTURING AND ASSEMBLING A CONTROL CAR ROLLER CLUTCH WITH FOUR PIECES

This invention relates to control car type roller clutches in general, and specifically to a method for making and assembling a control car type roller clutch that requires only four pieces.

BACKGROUND OF THE INVENTION

A new class of overrunning roller clutch was defined with the issuance of U.S. Pat. No. 4,821,856 to Lederman, assigned to the assignee of the subject invention. An entirely new component, called a control car, is fitted around each cylindrical roller, and slides back and forth with the roller between the cage side rails as the clutch operates. The control car provides numerous advantages, including highly secure, pre-installation shipping retention for both the rollers and springs. After installation, the cars can provide spin and skew control to the rollers, as well as better retention of the springs. As each control car moves back and forth with its roller, it receives guidance and control from the cage, and in some cases from the pathway race, but does not interfere with the free circumferential motion that allows the roller to continually maintain its lockup ready position.

The degree to which the control car is guided by the cage varies with the particular cage and car design used. In one embodiment disclosed in the above patent, side flanges on the car diagonally overlap with side rails on the cage, but are not completely confined by the cage. That is, each car side flange is prevented from moving in one radial direction by a side rail, but not in both directions. While this provides a good measure of cage to car guidance after installation, a releasable latch is used to retain the cars to the cage prior to installation. In a second embodiment in the same patent, each car has a pair of rails that are totally confined within, and closely guided by, matching tracks in the journal blocks. However, a pair of end rings must be used to retain the journal blocks and cars together, which are not needed in the first embodiment.

Despite the numerous potential advantages provided by the control cars, a drawback of the designs described above is that each control car and journal block must be handled as a separate piece when the roller clutch is assembled. Many roller clutches contain eight to sixteen rollers, meaning that eight to sixteen individual control cars must be separately handled, as well. Later patents have disclosed new designs intended to ease the task of assembling the separate control cars. For example, U.S. Pat. No. 4,924,980 to Lederman discloses a control car that may be inserted freely between the side rails of the cage with straight line, orthogonal motions only, with no need for tipping or forcing the car between the rails. U.S. Pat. No. 4,924,981 to Lederman discloses a control car in which specially designed flanges freely enter clearance slots on the cage side rails as the car is installed, but are blocked from re entering the slots once the spring has been added. Neither design deals with the fundamental problem that each car has to be handled and assembled as a separate piece, however.

SUMMARY OF THE INVENTION

The invention provides a method of making and assembling a control car roller clutch of the type that provides close, track type guidance to the roller cars, but in which the roller cars and journal blocks do not have to be handled during clutch assembly as separate components.

In the embodiment disclosed, a roller clutch made according to the method of the invention is adapted to be installed between a pair of conventional clutch races. A pathway race has a cylindrical pathway that is disposable coaxially to the inner surface of the cam race. The cam race inner surface is comprised of a plurality of sloped cam ramps separated by a plurality of partially cylindrical bearing surfaces.

Four parts are used altogether, which are manufactured initially as just three separate parts. Two generally annular end rings are sized to fit radially between the confronting inner surfaces of the clutch races. Each end ring has a circular track formed in at least one of its surfaces. A plurality of control cars and an equal plurality of journal blocks are initially molded integrally together with a carrier ring in an orientation that allows for simplified assembly to the end rings. Each control car, which is designed to receive a cylindrical roller inserted in the axial direction, has track followers in the form of circular ribs molded into each of its axial ends. The arcuate ribs are sized so as to slide freely within the end ring tracks. The journal blocks are sized to fit closely radially between the cam race bearing surfaces and confronting pathway, thereby maintaining the races in coaxial relation. Each of the journal blocks has an end to end axial length close to the end to end axial length of the control cars.

The control cars and journal blocks are molded to the carrier ring in an evenly spaced, alternating pattern, coaxial to the clutch races and aligned with the respective cam ramps and bearing surfaces. The juncture of each control car and journal block with the carrier ring is intended to be frangible and temporary, but is secure enough to maintain the structural integrity of the unit during handling and assembly. In the particular embodiment closed, the integral unit so created allows each roller be axially inserted into a car, and also allows for each spring to be loaded between a car and an adjacent journal block before the clutch is completed.

After the rollers and springs are inserted, the end rings are coaxially aligned with the integral unit and axially moved into abutment with the journal blocks. Simultaneously, the control car rails move freely into the end ring tracks. Next, the end rings are secured to the journal blocks and the carrier ring is broken away and removed, thereby creating the fourth component, which may be discarded. The length of the journal blocks relative to the control cars keeps the end rings spaced apart the proper distance to allow the control cars to slide freely in the tracks of the end rings. The control cars cannot escape from the tracks, however, and all components are retained solidly together.

It is, therefore, a general object of the invention to provide a method of manufacturing a control car type roller clutch in which the control cars do not have to be handled as separate components.

It is another object of the invention to provide such a method of manufacturing and assembling a control car type roller clutch of the type in which the control cars are fully confined within, and guided on both sides, by tracks in a pair of end rings.

It is still another object of the invention to provide a method of molding such a clutch in which the various components may be assembled by pushing them axially together without resistance.

It is yet another object of the invention to provide a method of molding such a clutch in which the control cars and journal blocks are temporarily integrated into a unit into which the rollers and springs may also be loaded and retained before the clutch is completed.

DESCRIPTION OF THE PREFERRED EMBODIMENT

These and other objects and features of the invention will appear from the following written description, and from the drawings, in which.

Figure 1:
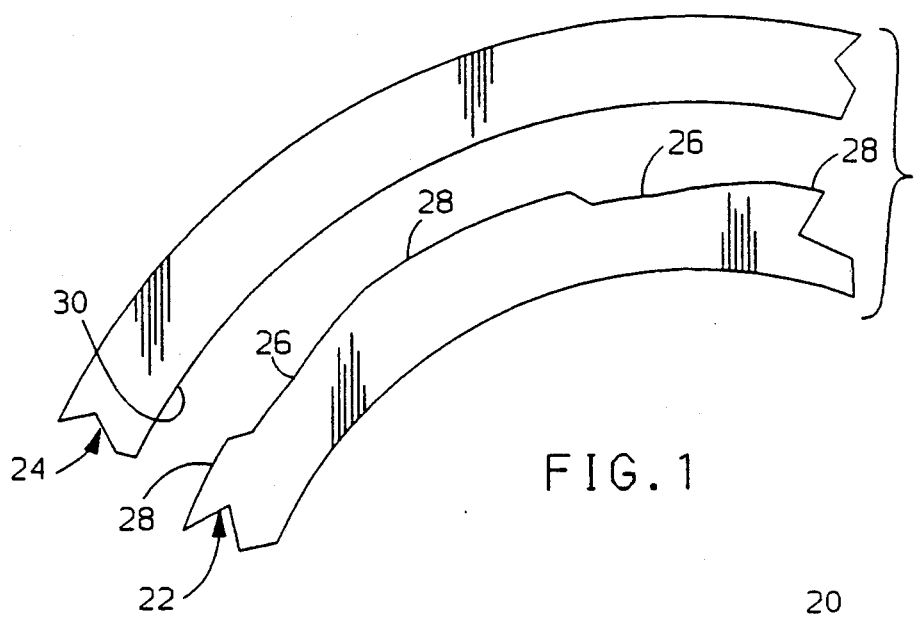
FIG. 1 is an axial view of a portion of a pair of coaxially disposed clutch races.
Figure 2:
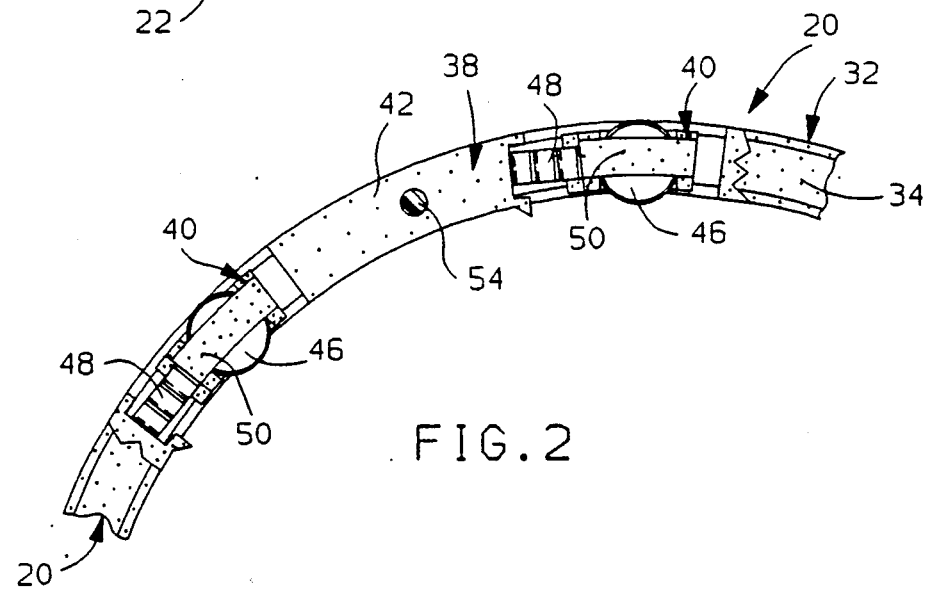
FIG. 2 is an axial view of a portion of a completed roller clutch made according to the method of the invention, prior to installation between the races.
Figure 3:
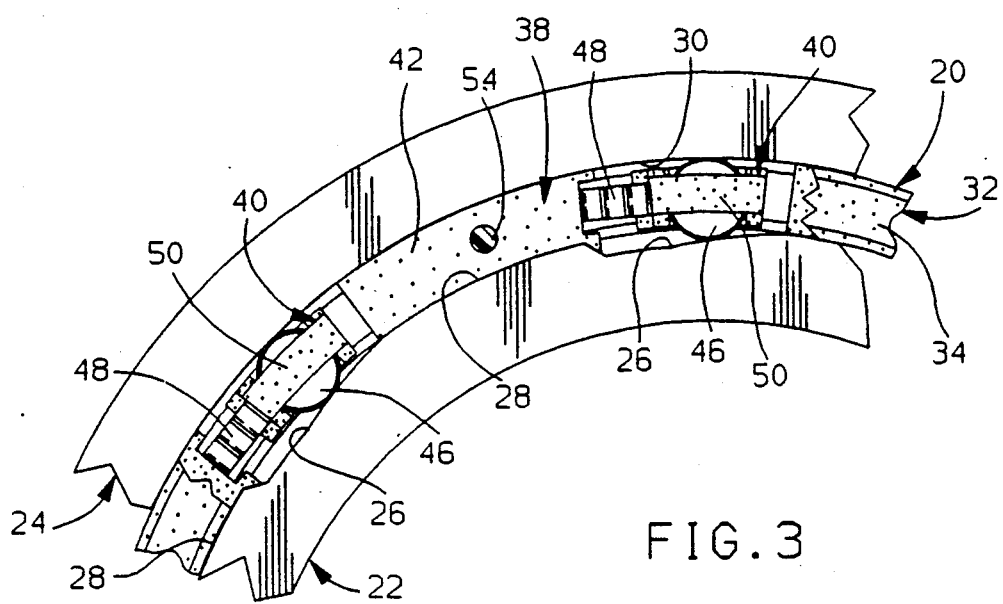
FIG. 3 is an axial view of a portion of a completed and assembled clutch.

Referring first to FIGS. 1 through 3, a preferred embodiment of a roller clutch made according to the method of the invention is indicated generally at 20. Roller clutch 20 is adapted to be installed between a pair of conventional clutch races, an inner cam race indicated generally at 22, and an outer pathway race indicated generally at 24. As best seen in FIG. 1, the races 22 and 24 may be coaxially disposed, with their inner surfaces confronting. The inner surface of cam race 22 is comprised of a plurality of eight sloped cam ramps 26 separated by eight partially cylindrical bearing surfaces 28. The inner surface of pathway race 24 is simply a cylindrical pathway 30. The races 22 and 24 are not maintained in coaxial relation until clutch 20 is installed between them, however, as shown in FIG. 3.

Figure 5:
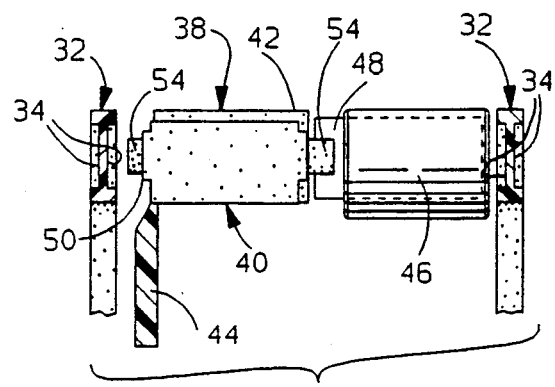
FIG. 5 is a sectional view taken along the line 5—5 of FIG. 4.
Figure 7:
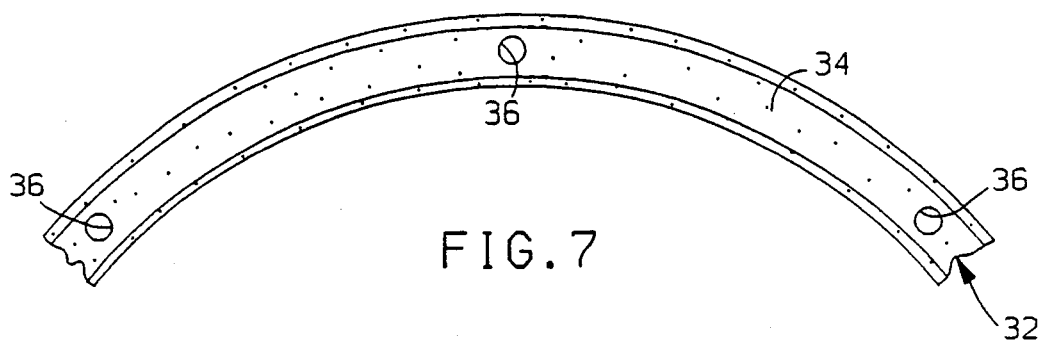
FIG. 7 is an axial view of a portion of an end ring.

Referring next to FIG. 5 and 7, two of the components of clutch 20 are illustrated in detail. Each of a pair of identical annular end rings, indicated generally at 32, is sized to fit radially between the bearing surfaces 28 and pathway 30, closely, but without binding. Each end ring 32 has a cross sectional shape similar to a shallow I beam, with a circular track 34 formed in each side thereof. Eight evenly spaced holes 36 pierce the web of each end ring 32, for a purpose described below. Those skilled in the molding art will recognize that the cross sectional shape of an end ring 32, relative to its central axis, is one that is amenable to bypass molding, a technique described in more detail below. That is, as seen in FIG. 5, no exterior surface of end ring 32, either of the tracks 34 or the holes 36, has any concavity or undercut relative the central axis. Thus, it would be relatively easy to injection mold each end ring 32 of a suitable plastic. Furthermore, while two separate end rings like 32 are needed, manufacture is further eased by the fact that they are identical, and by the fact that they are totally symmetrical, with no preferred orientation.

Figure 4:
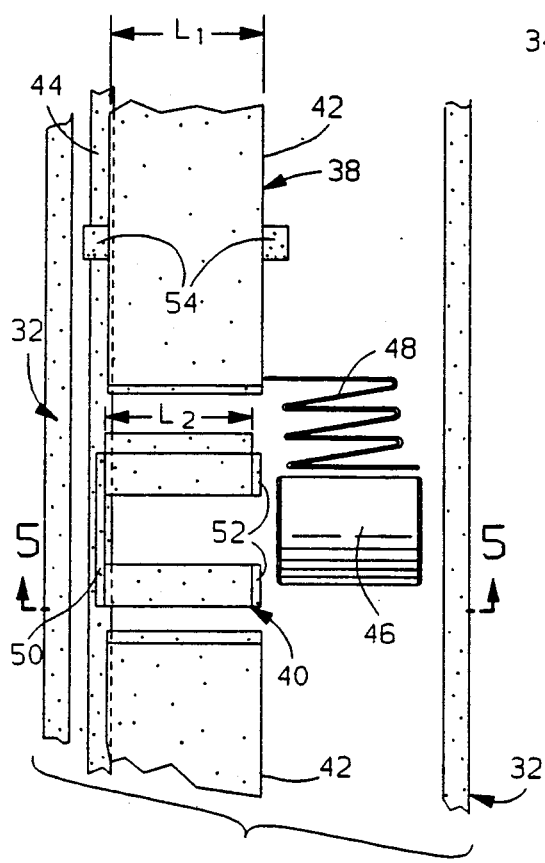
FIG. 4 is an exploded view, looking radially inwardly, of a roller clutch made according to the method of the invention.
Figure 6:
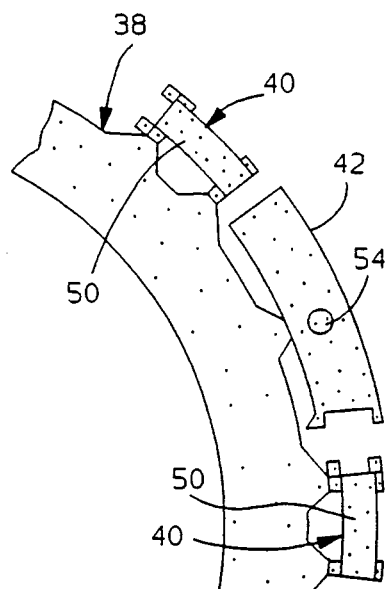
FIG. 6 is a axial view of approximately half of the integrated unit of journal blocks, control cars, and carrier ring, prior to final assembly.
Figure 6:
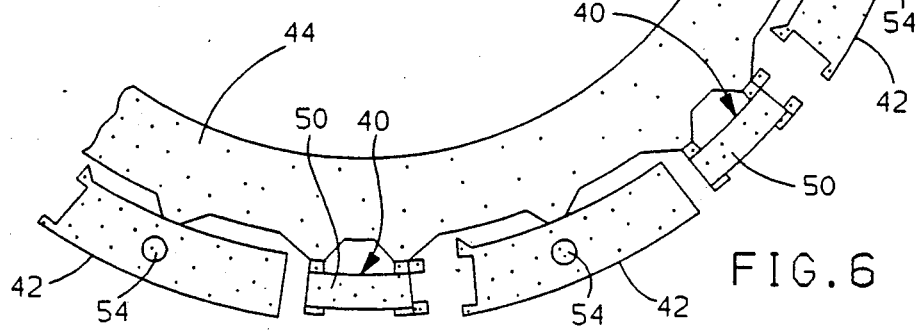
Figure 10:
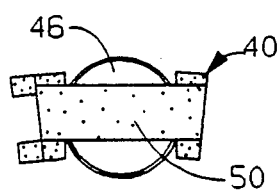
FIG. 10 is an axial view of a control car alone with a roller inserted.

Referring next to FIGS. 4 through 6, and to FIG. 10, the remaining components of clutch 20 and their manufacture are described. What would otherwise constitute several separate components are molded into an integral unit, indicated generally at 38, in a manner described in more detail below. Unit 38 includes eight identical control cars, each indicated generally at 40, and eight identical journal blocks, each indicated generally at 42. These are temporarily retained together by an annular carrier ring 44. Generally speaking, each control car 40 is sized to fit freely between the pathway 30 and a confronting cam ramp 26, while each journal block 42 is sized to fit radially closely between pathway 30 and the confronting bearing surfaces 28, so as to keep the races 22 and 24 coaxial. More particularly, unit 38 and its constituent parts are designed to cooperate with eight cylindrical rollers 46 and their accompanying energizing springs 48. To that end, each control car 40 is molded generally in the shape of an open ended, three sided box. The axial length of each car 40, $L_2$, is substantially equal to the length of a roller 46, and its interior surfaces are shaped to conform to enough of a roller 46 to retain it against falling out in the radial direction, as shown in FIG. 10. Each control car 40 also has track followers in the form of arcuate rails, a one piece rail 50 on one axial end, and a rail 52 on the other end that is interrupted, but which lies on the same radius as 50. The rails 50 and 52 extend axially beyond the $L_2$ length of car 40, and are sized to fit freely within the end ring tracks 34. Each journal block 42 has an end to end length, $L_1$, close to $L_2$, and is molded with a pair of opposed pins 54 that extend axially beyond $L_1$. Each pin 54 is sized to fit through an end ring hole 36.

Figure 8:
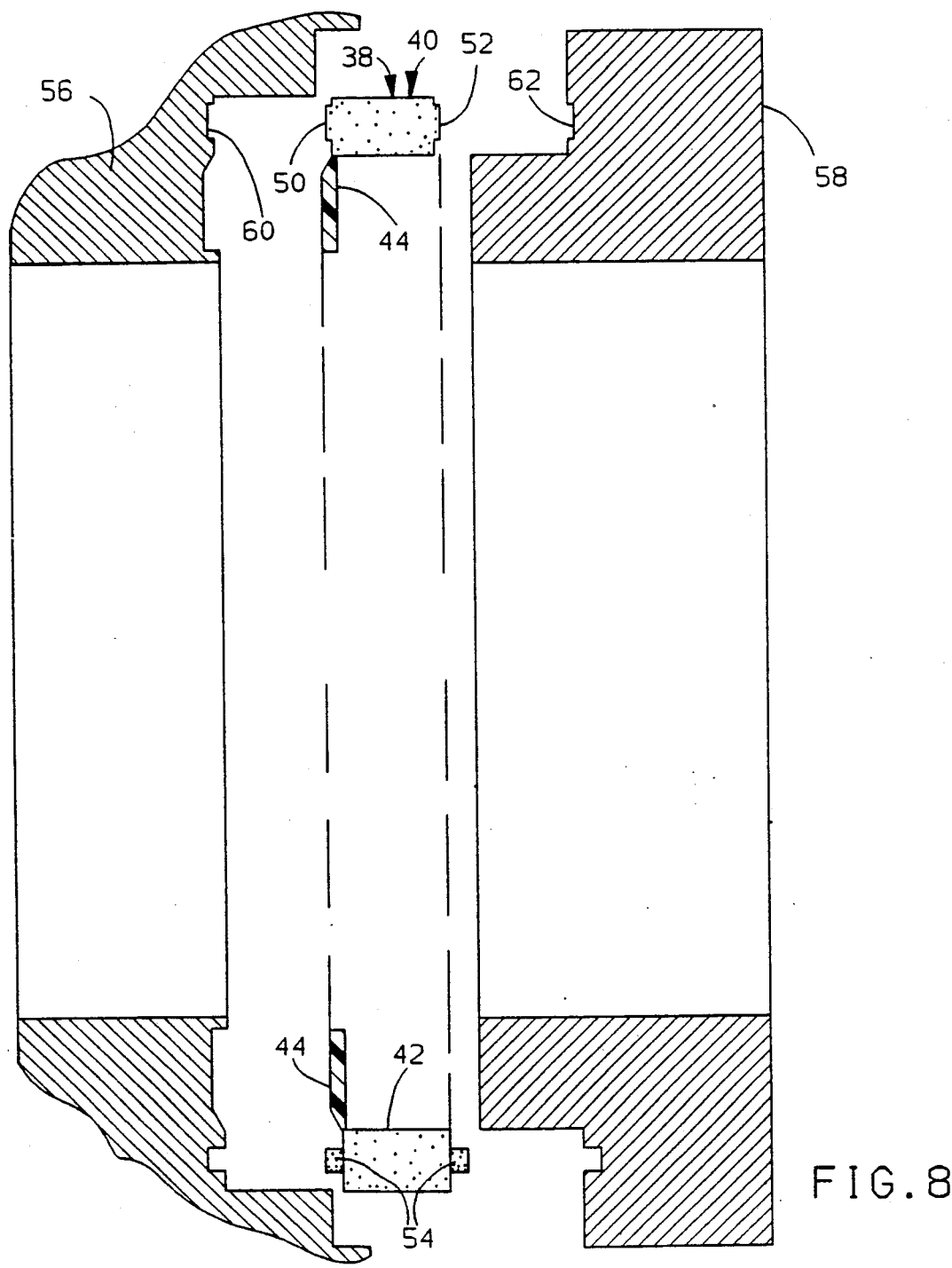
FIG. 8 is a cross sectional view of the integral unit of FIG. 6 and the molds that produce it.
Figure 9:
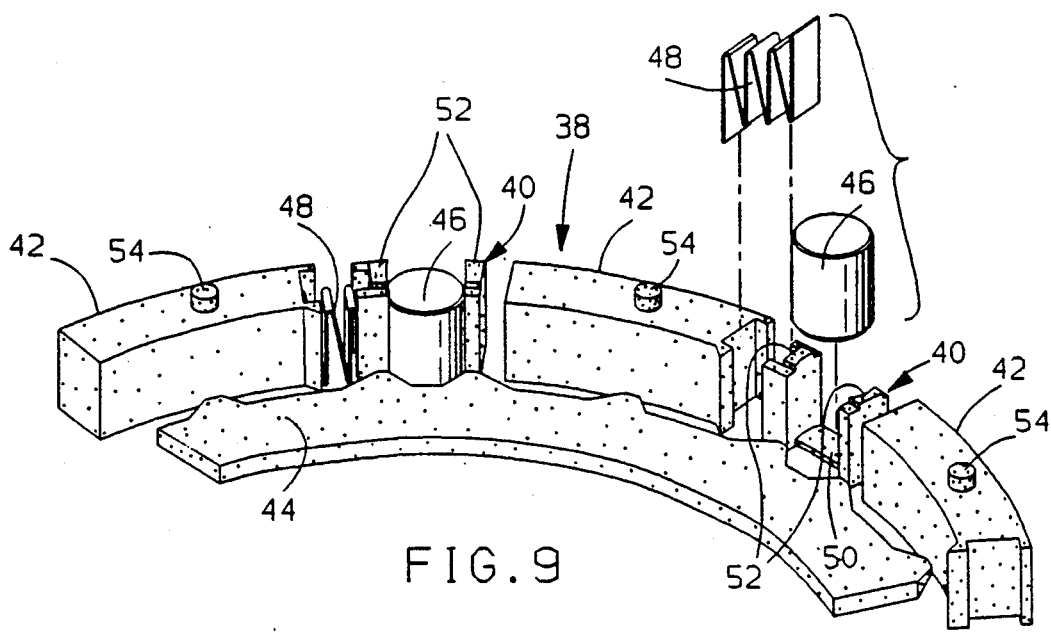
FIG. 9 is a perspective of the unit of FIG. 6 showing the rollers and springs being loaded into it.

Referring next to FIGS. 8 and 9, more detail on the manufacture of unit 38 is illustrated. Just as with end rings 32, the shape of the control cars 40 and journal blocks 42, as well as the annular carrier ring 44, are amenable to bypass molding. When they are arranged as shown in FIG. 9, parallel to one another and coaxial to a central axis that is coincident with the axis of the clutch races 22 and 24, the exterior surfaces of cars 40 and blocks 42 have no concavity or undercut relative to the axis. Thus, unit 38 may be molded as illustrated in FIG. 8 by a single pair of molds, indicated generally at 56 and 58. Troughs 60 and 62 are machined into molds 56 and 58 with interior surfaces that match the exterior surface of either side of the various components of unit 38. This allows unit 38 to be injection molded by closing and parting the molds 56 and 58 along the central axis of unit 38, with no other moving mold parts. The control cars 40 and journal blocks 42 are molded to the carrier ring 44 in an alternating evenly spaced pattern, each aligned with a respective cam ramp 26 and bearing surface 28. The juncture of each control car 40 and journal block 42 with the carrier ring 44 is strong enough to maintain unit 38 whole through ordinary shipping and handling, but weak enough to allow carrier ring 44 to be broken away later. The end rings 32 and unit 38 would not have to be manufactured in any particular order, but all three would be molded before the remaining steps of the method were carried out, as described next.

Figure 11:
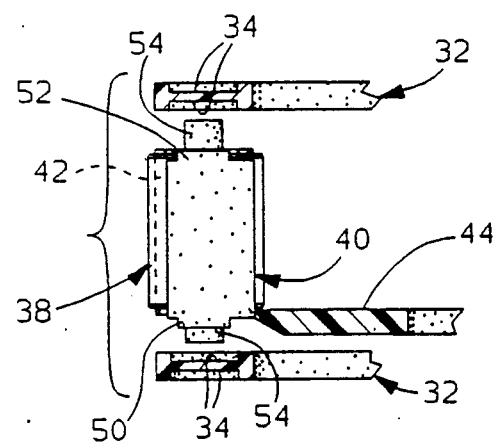
FIG. 11 is a view like FIG. 5, showing the components in the process of being pushed axially together.

Referring next to FIGS. 9 and 11, the dimensions of the control cars 40 described above allow them to freely receive and retain a roller 46, if maintained in an upright, vertical orientation. By holding unit 38 in the upright orientation of FIG. 9, a spring 48 may also be inserted into the open slot formed between each control car 40 and its adjacent journal block 42. Since the rollers 46 and springs 48 may be inserted along straight lines, without significant resistance, their installation to unit 38 is particularly suitable to automated, machine assisted methods. Even if done manually, the task is considerably less burdensome than forcing each into place as a last step, along a radial path. Once unit 38 is fully loaded, it acts as a jig to hold the rollers 46 and springs 48 securely in place. Next, the end rings 32 are aligned with the unit 38 and moved coaxially together toward unit 38, as shown in FIG. 11.

Figure 12:
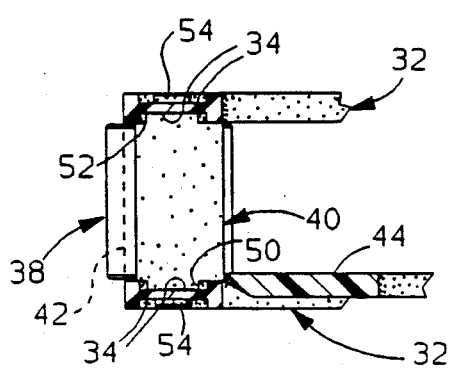
FIG. 12 is a view showing the components pushed axially together, before the end rings are secured.
Figure 13:
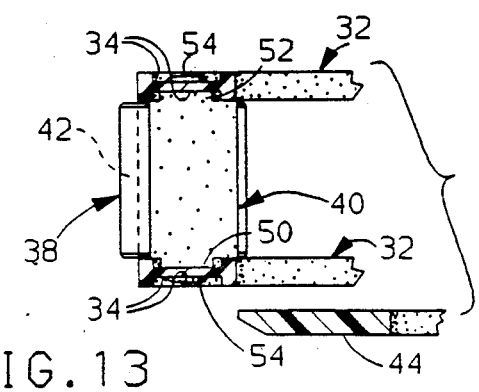
FIG. 13 is a view showing the completed clutch with the carrier ring broken off and removed.

Referring finally to FIGS. 12 and 13, the end rings 32 are moved together until their inner surfaces abut the journal blocks 42. Concurrently, the control car rails 50 and 52 move freely into the end ring tracks 34, and the journal block pins 54 move through the holes 36. The end rings 32 are then secured to the journal blocks 42 by heading over the pins 5. As a final step, the now redundant carrier ring 44 is broken away and removed, thereby creating a fourth component, in addition to the end rings 32 and the original integral unit 38. Removing carrier ring 44 frees the control cars 40 to slide in the tracks 34. The completed clutch 20 is solid and secure. The control cars 40 are completely retained against removal in any direction, since the rails 50 are captured in the tracks 34, between the adjacent journal blocks 42. Because of the $L_1$, $L_2$ relation described above, the abutment of the end rings 32 with the journal blocks 42 maintains the end rings 32 spaced axially apart the proper distance to allow the rails 50 and 52 to slide freely back and forth. Completed clutch 20 can be vigorously handled with little chance of any parts loss, and can be installed between the races 22 and 24 by conventional methods.

Variations in the disclosed method could be made. The end rings 32 could be machined of metal, if desired. Since the journal blocks 42 absorb the loads between the races 22 and 24, there would be little reason to make the end rings 32 that robust, however, and it would be much more cost effective to mold them as the unit 38 is molded. Theoretically, the cars 40 and blocks 42 could be first molded separately, and later joined to the carrier ring 44 to create unit 38, by temporary gluing or some other means. This might be indicated if, for example, a different shape for the car 40 were desired, such as a complete, four-sided box, a shape that would not be amenable to bypass molding along with the rest of unit 38. At the time of assembling clutch 20, at least, the cars and journal blocks would not have to be handled as separate components, although they would be earlier. It is a great advantage in manufacturing to mold the unit 38 in one step, however. Theoretically, the rollers 46 and springs 48 could be installed conventionally, after the end rings 32 were secured and carrier ring 44 discarded. However, it is unlikely that the assembler would wish to forgo the convenience of also using the unit 38 as an installation jig for the rollers and springs.

The embodiments of the invention in which an exclusive property or privilege is claimed are defined as follows:

1. A method for manufacturing and assembling a control car roller clutch of the type that is adapted to be installed between a pathway race and cam race, said pathway race having a cylindrical pathway, said cam race having an inner surface comprised of a plurality of sloped cam ramps separated by a plurality of partially cylindrical bearing surfaces disposable in coaxial confronting relation to said pathway, said method comprising the steps of,
   providing a pair of generally annular end rings having inner surfaces and sized to fit radially between said races, each of said end rings having a generally circumferentially extending track on the inner surface thereof,
   providing a plurality of control cars, each of said control cars being sized to fit radially between a respective cam ramp and confronting pathway and, each of said control cars also having axial ends comprising a track follower adapted to freely slidably interfit with a respective end ring track,
   providing a plurality of journal blocks sized to fit closely radially between said cam race bearing surfaces and confronting pathway,
   frangibly joining said control cars and journal blocks in circumferentially alternating and coaxial relation to a carrier ring thereby creating an integral unit with each control car circumferentially aligned with a respective cam ramp and each journal block circumferentially aligned with a respective bearing surface,
   coaxially aligning each end ring with said integral unit and axially moving each end ring toward said integral unit until said control car track followers move axially into said end ring tracks,
   securing said end rings to said journal blocks, and,
   breaking and removing said carrier ring, thereby freeing said control cars to slide in said end ring tracks.

2. A method for manufacturing and assembling a control car roller clutch of the type that is adapted to be installed between a pathway race and cam race, said pathway race having a cylindrical pathway, said cam race having an inner surface comprised of a plurality of sloped cam ramps separated by a plurality of partially cylindrical bearing surfaces disposable in coaxial confronting relation to said pathway, said method comprising the steps of,
   providing a pair of generally annular end rings having inner surfaces and sized to fit radially between said races, each of said end rings having a generally circular track on at least the inner surface thereof,
   providing a plurality of control cars, each of said control cars being sized to fit radially between a respective cam ramp and confronting pathway and, each of said control cars also having an arcuate rail on each axial end thereof sized to freely slidably interfit with a respective end ring track,
   providing a plurality of journal blocks sized to fit closely radially between said cam race bearing surfaces and confronting pathway,
   frangibly joining said control cars and journal blocks in circumferentially alternating and coaxial relation to a carrier ring thereby creating an integral unit with each control car circumferentially aligned with a respective camp ramp and each journal block circumferentially aligned with a respective bearing surface, coaxially aligning each end ring with said integral unit and axially moving each end ring into abutment with said journal blocks, thereby moving said control car rails axially into said end ring tracks, securing said end rings to said journal blocks, and, breaking and removing said carrier ring, thereby freeing said control cars to slide in said end ring tracks.

3. A method for manufacturing and assembling a control car roller clutch of the type that has a plurality of cylindrical rollers and energizing springs and is adapted to be installed between a pathway race and cam race, said pathway race having a cylindrical pathway, said cam race having an inner surface comprised of an equal plurality of sloped cam ramps separated by a plurality of partially cylindrical bearing surfaces disposable in coaxial confronting relation to said pathway, said method comprising the steps of, providing a pair of generally annular end rings having inner surfaces and sized to fit radially between said races, each of said end rings having a generally circular track on at least the inner surface thereof, providing a plurality of control cars, each of said control cars having a shape of an open ended box sized to axially receive and closely contain a roller and to also fit radially between a respective cam ramp and confronting pathway, each of said control cars also having an arcuate rail on each axial end thereof sized to freely slidably interfit with a respective end ring track, providing a plurality of journal blocks sized to fit closely radially between said cam race bearing surfaces and confronting pathway, frangibly joining said control cars and journal blocks in circumferentially alternating and coaxial relation to a carrier ring with the open ends of said cars facing in the same axial direction, thereby creating an integral unit with each control car circumferentially aligned with a respective cam ramp and each journal block circumferentially aligned with a respective bearing surface, supporting said integral unit in a substantially vertical orientation, inserting a roller axially into each open ended control car and a spring between each control car and the journal block adjacent to it, thereby temporarily supporting said rollers and springs, coaxially aligning each end ring with said integral unit and axially moving each end ring into abutment with said journal blocks, thereby moving said control car rails axially into said end ring tracks, securing said end rings to said journal blocks, and, breaking and removing said carrier ring, thereby freeing said control cars to slide in said end ring tracks.

* * * * *